United States Patent [19]

Ushijima et al.

[11] 4,083,184
[45] Apr. 11, 1978

[54] SYSTEM TO SUPPLY AIR INTO THE EXHAUST CONDUIT OF AN INTERNAL COMBUSTION ENGINE

[75] Inventors: Takashi Ushijima, Tokyo; Yoshio Iwasa, Nagareyama, both of Japan

[73] Assignee: Nissan Motor Company, Limited, Japan

[21] Appl. No.: 711,522

[22] Filed: Aug. 4, 1976

[30] Foreign Application Priority Data

Aug. 18, 1975 Japan .......................... 50-113049[U]

[51] Int. Cl.² .............................................. F01N 3/10
[52] U.S. Cl. .................................. 60/293; 137/515.7; 137/856
[58] Field of Search ........................ 60/293, 304, 305; 137/515.7, 856

[56] References Cited

U.S. PATENT DOCUMENTS

| | | | |
|---|---|---|---|
| 2,875,776 | 3/1959 | Skipwith | 137/515.7 |
| 3,286,728 | 11/1966 | Stephenson | 137/856 |
| 3,653,212 | 4/1972 | Gast | 60/293 |
| 3,662,541 | 5/1972 | Sawada | 60/293 |
| 3,700,001 | 10/1972 | Rudel | 137/515.7 |
| 3,906,722 | 9/1975 | Garcea | 60/293 |
| 3,906,724 | 9/1975 | Yoshizaki | 60/305 |

Primary Examiner—Douglas Hart
Attorney, Agent, or Firm—Robert E. Burns; Emmanuel J. Lobato; Bruce L. Adams

[57] ABSTRACT

A reed valve device having two reeds capable of selectively closing and opening the corresponding openings formed in the device is snugly fitted in a casing through an elastomeric sealing member without using any other connecting means. The casing communicates with an exhaust conduit system of an internal combustion engine so that the reed valve device functions to intermittently admit air into the exhaust conduit system by the pulsations of the exhaust gas under pressure passing through the exhaust conduit system.

7 Claims, 4 Drawing Figures

SYSTEM TO SUPPLY AIR INTO THE EXHAUST CONDUIT OF AN INTERNAL COMBUSTION ENGINE

BACKGROUND OF THE INVENTION

The present invention relates in general to a secondary air supply system which is constructed to supply air into an exhaust conduit system of an internal combustion engine for completely burning the remaining unburned combustible compounds, such as hydrocarbons (HC) and carbon monoxide (CO), contained in the exhaust gases emitted from the engine, and more particularly to a so called reed valve device which is employed in the secondary air supply system for promoting the admission of air into the exhaust conduit system of the engine by the pulsations of the exhaust gases passing through the conduit system.

In a reed valve device employed in the secondary air supply system, it is very necessary not only to minimize the air-flow resistance of the device for increasing the flow rate of air into the exhaust conduit system but also to tightly seal the device for completely preventing exhaust gas leaks into the open air. Furthermore, it is necessary to avoid the unpleasant chattering phenomenon caused by vibrations of the reed proper of the device.

In a conventional reed valve device, however, it has been observed that the connection of the reed valve device to its casing is made in such manner that a base on which the reed proper is mounted is directly connected to the casing by means of bolts. In this connecting method, there exists a possibility of warping of the base of the device as the bolts are screwed for connecting the same to the casing. This warping will cause the above-mentioned leaks of the heated exhaust gases into the open air. Furthermore, under this connecting condition, there will also occur a problem that the vibrations of the reed proper are directly transmitted to the casing of the reed valve device through the bolts thus causing the unpleasant noises.

SUMMARY OF THE INVENTION

Therefore, the present invention is proposed to eliminate the above-mentioned drawbacks encountered in the prior art reed valve device used in the secondary air supply system for the exhaust conduit system of the internal combustion engine.

It is an object of the present invention to provide a secondary air supply system having an improved reed valve device which is held in an air inlet section of the secondary air supply system only by means of a cushion member.

It is another object of the present invention to provide a secondary air supply system for admitting air into the exhaust conduit system of an internal combustion engine, the system comprising: a casing having one open end fluidly connected to the exhaust conduit system and the other open end communicates with the open air; non-return valve means disposed in the casing for temporally providing a fluid communication between the exhaust conduit system and open air when a negative pressure higher than the predetermined value is applied thereto from the exhaust conduit system; and an elastic frame member sealingly and tightly inserted between a clearance defined between the outer periphery of the non-return valve means and the inner surface of the casing.

BRIEF DESCRIPTION OF THE DRAWINGS

Other objects and advantages of the secondary air supply system according to the present invention will become more clear from the following description when taken in conjunction with the accompanied drawings, in which.

DESCRIPTION OF THE PREFERRED EMBODIMENT

Figure 1:
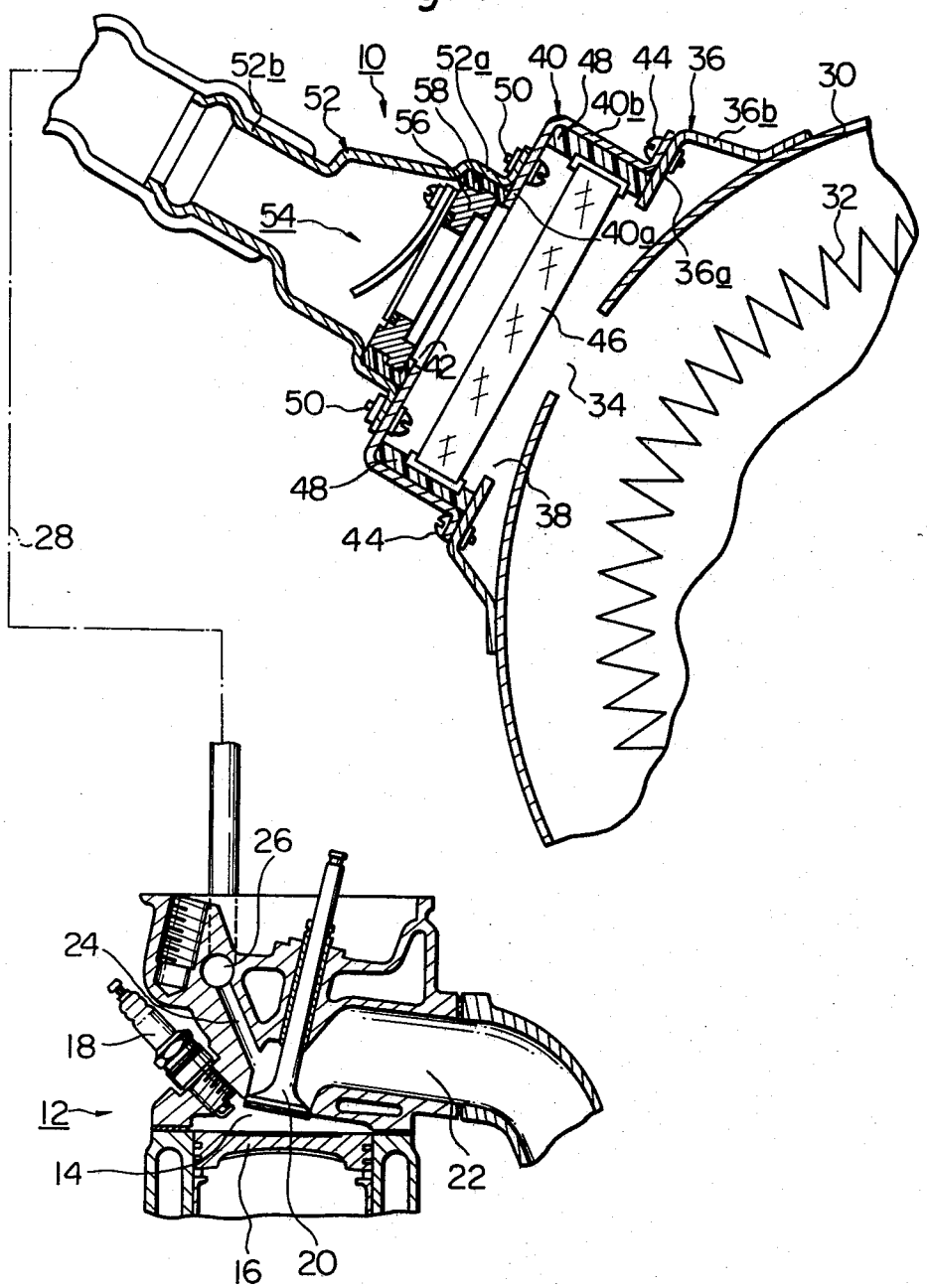
FIG. 1 is a sectional view of a secondary air supply system according to the present invention, the system being illustrated to employ an improved reed valve device in an air inlet section thereof.

Referring now to FIG. 1 of the drawings, there is shown an air inlet section 10 of a secondary air supply system for an exhaust system of an internal combustion engine 12. The engine is illustrated to have a combustion chamber 14, a piston 16, a spark-plug 18, an exhaust valve 20 and an exhaust outlet 22 as is well known in the art. Furthermore, the engine 12 is formed with a passage 24 providing a fluid communication between an exhaust outlet 22 and an air injection manifold 26 mounted on the engine 12. The air injection manifold 26 communicates with the above-mentioned air inlet section 10 of the secondary air supply system through a conduit designated by the numeral 28.

The air inlet section 10 is mounted on an air filter casing 30 containing in it a pleated filter element 32 and having an opening 34. The filter element 32 is used for cleaning the air admitted into the internal combustion engine 12. The air inlet section 10 comprises a support member 36 which has a flat portion 36a with a hole 38, and a side wall portion 36b firmly connected at its lower end to the air filter casing 30 so as to surround the opening 34. Mounted onto the flat portion 36a of the support member 36 is a filter casing 40 which has also a flat portion 40a with a hole 42, and a side wall portion 40b firmly connected at its lower end to the flat portion 36a of the support member 36 by means of bolts and nuts 44. As shown, the filter casing 40 contains therein a filter element 46 which is sealingly sandwiched by two sealing members 48 adhered to the inner surfaces of the side wall portion 40b of the filter casing 40. With this construction, the space surrounded by the filter element 46, the support member 36 and the air filter casing 30 will act as an expansion chamber. Mounted on the flat portion 40a of the filter casing 40, by means of bolts and nuts 50, is a tube connector 52 which is formed at its one end with a reed valve device receiving portion 52a in the vicinity of the filter casing 40, the reed valve device receiving portion 52a having a generally rectangular cross section in this embodiment for the reason which will be described hereinlater. The tube connector 52 is further formed at the other end thereof with a tube connecting portion 52b connected with the prior mentioned conduit 28. Within the reed valve device receiving portion 52a of the tube connector 52 is disposed a reed valve device 54 which has an improved construction in comparison with the prior art device.

Figure 2:
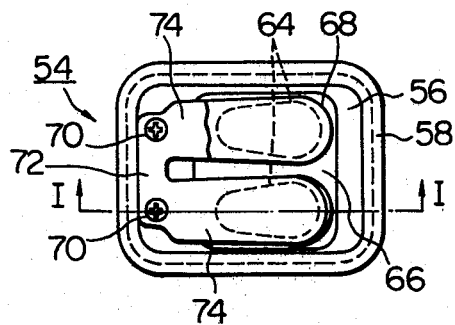
FIG. 2 is a plan view, partly cutaway to show the interior construction of the improved reed valve device.
Figure 3:
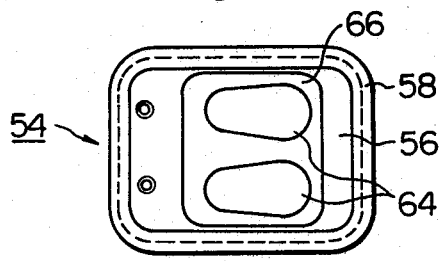
FIG. 3 is a plan view of the reed valve device excluding some parts.
Figure 4:
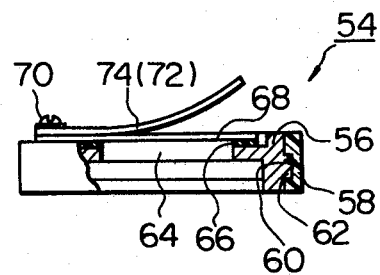
FIG. 4 is a sectional view, partly cut away, taken along the line I-I of FIG. 2.

The reed valve device 54 comprises a generally rectangular shaped base member 56 which is tightly coupled in the prior mentioned reed valve device receiving portion 52a of the tube connector 52, through a sealing frame 58 made of some suitable elastomeric material such as rubber. The base member 56 may be constructed of aluminum alloy. As well shown in FIGS. 2 and 3, the sealing frame 58 is constructed to embrace the whole side edge of the base member 56. Preferably, the embracement by the frame 58 of the base member 56 is made in such a manner that, as well shown in FIG. 4, a recess 60 formed along an inner side of the frame 58 snugly receives therein a raised portion 62 which is provided along the outer side edge portions of the base member 56 for achieving a tight connection between the sealing frame 58 and the base member 56. The base member 56 is formed therein with two generally oval openings 64 which are equal in shape in this case. Around the openings 64 in the upper side of the base member 56 is formed a rectangular recess (no numeral) which receives therein a valve seat 66 made of some suitable elastomeric material such as rubber. Two reeds proper 68 each having a sufficient surface to cover up the corresponding opening 64 are connected at one end thereof to one side of the base member 56 through bolts 70. Preferably, each of the reeds proper 68 is made of stainless steel having a thickness ranging from 0.05 to 0.3 mm. A stopper 72 having two outwardly curved stopping arms 74 is fixed to the one side of the base member 56, by means of the bolts 70, for preventing the excess outward movement of the reeds proper 68 during the air inlet operation of the secondary air supply system.

Under the engine operation, pulsating negative pressure is generated in the exhaust conduit system including the exhaust outlet 22 and the passage 24 of the engine 12, so that air is intermittently fed into the exhaust conduit system by the pumping operation of the reed valve device 54. Now, it should be noted from the above, that the secondary air supply system including the above mentioned improved reed valve device 54 has the following advantages and merits, in which:

1. Since the connection of the reed valve device 54 to the reed valve device receiving portion 52a of the tube connector 52 is made only by the sealing frame made of elastomeric material, no deformation of the device 54, specifically of the base member 56, can occure so that preferable contacting surfaces between the reeds proper 68 and the valve seat 66 are formed. Thus, the leakage of the exhaust gases into the air filter casing 30 will be prevented. Furthermore, the vibrations of the reeds proper 68 due to the pulsation of the exhaust gases are not directly transmitted to the tube connector 52 connected to the air filter casing 30 which acts as a resonance box. Thus, generation of unpleasant noises due to the vibrations of the reeds proper 68 is repressed. Furthermore, the vibrations of the air filter casing 30 caused by the vibrations of the engine are not directly transmitted to the base member 56 with the reeds proper 68, so that the life-time of the reed valve device 54 is considerably extended. 2. Since the space surrounded by the filter elements 46, the support member 36 and the air filter casing 30 can act as an expansion chamber or a silencer, the unpleasant noises from the reeds proper will be decreased to a minimum.

What is claimed is:

1. A secondary air supply system for admitting air into the exhaust conduit system of an internal combustion engine provided with an air filter housing and a filter element therein for cleaning the air admitted thereinto, comprising:
   a first casing having an open end connected to said air filter housing to provide fluid communication between the interior thereof and the interior of said housing, said first casing having a volume sufficient to make the first casing to act as an expansion chamber and thereby function as a noise silencer;
   a second casing having an open end connected to said exhaust conduit system and another open end connected to another open end of said first casing so that the interior of said second casing communicates through the interior of said first casing with the interior of said air filter housing;
   a reed valve device stationarily disposed in said second casing for selectively opening and blocking a fluid communication between said exhaust conduit system and the interior of said air filter housing in accordance with the magnitude of a negative pressure applied thereto from said exhaust conduit system; and
   an elastomeric frame member in a space defined between the periphery of said reed valve device and a corresponding portion of the inner surface of said second casing for tightly supporting said reed valve device in said second casing without using any other supporting means.

2. A secondary air supply system for admitting air into the exhaust conduit system of an internal combustion engine having an air filter housing and a filter element therein for cleaning the air admitted into said engine, comprising:
   a first casing having one open end connected to said air filter housing to provide communication between the interior thereof and the interior of said housing, said first casing having a volume sufficient effective to make the first casing act as an expansion chamber and thereby function as a noise silencer;
   a second casing having one open end connected to said exhaust conduit system and another end connected to another open end of said first casing so that the interior of said second casing communicates through the interior of said first casing with the interior of said air filter housing;
   a base member stationarily disposed in said second casing and having therein at least one opening;
   an elastomeric frame member about the outer periphery of said base member;
   a valve seat attached to said base member and surrounding said opening of said base member; and
   at least one reed member connected at one end to said base member to substantially cover up said opening of said base member, said reed member being operable to selectively open and close said opening in accordance with the magnitude of a negative pressure applied thereto from said exhaust conduit system; and
   said elastomeric frame member being disposed in a space defined between the periphery of said base member and a corresponding portion of the inner surface of said second casing thereby sealingly and tightly supporting said base member in said second casing.

3. A secondary air supply system as claimed in claim 2, further comprising a stop connected to said base member to prevent excess movement of said reed member in a direction away from the opening of said base member.

4. A secondary air supply system as claimed in claim 2, in which said reed member is made of stainless steel plate having a thickness ranging from 0.05 to 0.3 mm.

5. A secondary air supply system as claimed in claim 2, in which said elastomeric frame member comprises a recess along an inner surface of said elastomeric frame member, and in which said base member comprises along the lateral periphery thereof a raised portion disposed snugly in said recess along an inner surface portion of said elastomeric frame member.

6. A secondary air supply system as claimed in claim 2, further comprising an air filter element disposed in said first casing.

7. A secondary air supply system as claimed in claim 6, including a sealing member supporting the last-mentioned air filter.

* * * * *